(12) United States Patent
Butler

(10) Patent No.: US 8,111,997 B2
(45) Date of Patent: Feb. 7, 2012

(54) MULTIPLE MOVABLE BARRIER OPERATOR SYSTEM AND METHOD

(75) Inventor: Brian Frederic Butler, Chicago, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 639 days.

(21) Appl. No.: 12/164,224

(22) Filed: Jun. 30, 2008

(65) Prior Publication Data
US 2009/0324235 A1  Dec. 31, 2009

(51) Int. Cl.
*H04B 10/10* (2006.01)
(52) U.S. Cl. .............. 398/107; 340/5.71; 49/25
(58) Field of Classification Search .......... 340/5.7–5.71; 49/25, 26, 102, 324, 357; 398/106–111
See application file for complete search history.

(56) References Cited

U.S. PATENT DOCUMENTS

| | | |
|---|---|---|
| 4,429,492 A | 2/1984 | Imhoff |
| 4,653,229 A | 3/1987 | Feucht |
| 4,663,887 A | 5/1987 | Storandt et al. |
| 5,286,967 A | 2/1994 | Bates |
| 5,651,216 A | 7/1997 | Tillmann |
| 5,729,101 A | 3/1998 | Richmond et al. |
| 5,944,399 A | 8/1999 | Gillispie |
| 6,449,904 B1 | 9/2002 | Paasonen |
| 6,564,510 B2 | 5/2003 | Juntunen et al. |
| 6,591,551 B2 | 7/2003 | Winkler |
| 6,877,278 B2 | 4/2005 | Karkkainen et al. |
| 7,187,150 B2 | 3/2007 | Robb et al. |
| 7,332,999 B2 * | 2/2008 | Fitzgibbon ............... 340/5.71 |
| 7,971,316 B2 | 7/2011 | Copeland et al. |
| 2009/0320374 A1 | 12/2009 | Jankovsky |

* cited by examiner

*Primary Examiner* — Leslie Pascal
(74) *Attorney, Agent, or Firm* — Fitch Even Tabin & Flannery

(57) ABSTRACT

A first moveable barrier operator is actuated to move a first moveable barrier and a light beam is encoded with operational information regarding the first movable barrier operator. The encoded light beam is transmitted from an emitter associated with the first moveable barrier operator to a first detector associated with the second moveable barrier operator. The second moveable barrier operator may be subsequently operated at least in part according to the operational information encoded in the light beam.

23 Claims, 3 Drawing Sheets

MULTIPLE MOVABLE BARRIER OPERATOR SYSTEM AND METHOD

CROSS REFERENCES TO RELATED APPLICATION

U.S. application Ser. No. 12/164,239, filed Jun. 30, 2008, titled "Movable Barrier Operator Synchronization System and Method" the contents of which are incorporated herein by reference in its entirety.

FIELD OF THE INVENTION

The field of the invention relates to movable barrier operators systems and, more specifically, to operating multiple barrier operators.

BACKGROUND

Different types of moveable barrier operators have been sold over the years and these barrier operator systems have been used to actuate various types of moveable barriers. For example, garage door operators have been used to move garage doors and gate operators have been used to open and close gates.

Such barrier movement operators may include various mechanisms to facilitate the opening and closing of the barriers. For instance, a wall control unit may be coupled to the barrier movement operator and send signals to an operator control system thereby causing the operator to open and close the barrier. In addition, operators often include a receiver unit at the operator control system to receive wireless transmissions from a hand-held code transmitter or from a keypad transmitter, which may be affixed to the outside of the area barred by the barrier or other structure.

In some previous systems, multiple barrier operators are deployed within the same system to move multiple barriers. For example, in a dual gate system, a first gate operator is used to move a first gate while a second gate operator is used to move a second gate. In this situation, the two gates have to be moved by the gate operators in harmony in order to avoid problems such as the wrong gate closing first when a predetermined order is required.

Various attempts have been made to allow multiple movable barriers to operate in synchronization. In one example, wires were installed to connect the two operators and facilitate communication between the two operators via the wires. Unfortunately, this often required digging a trench for the wires and this could be difficult or costly to implement in existing driveways that were composed of asphalt or concrete. The number of wires also often increased with the complexity of the system thereby making the installation of the wires difficult or cumbersome. Radio Frequency (RF) communication between the different barrier operators was also attempted. In these approaches, RF signals were sent from one barrier operator to another in order to coordinate operations between different barrier operators. Unfortunately, RF-based systems were sometimes subjected to interference of the signals thereby making it difficult or impossible to coordinate the operation of the multiple barrier operators.

SUMMARY

Approaches are provided that control the operation of multiple moveable barrier operators. These approaches utilize a beam of light to communicate information from a first movable barrier operator to at least one other movable barrier operator. These approaches are easy to use, do not require trenching or use of wires between barrier operators, and have a high resistance to electromagnetic interference.

In many of these embodiments, a first moveable barrier operator is actuated to move a first moveable barrier and a light beam is encoded with operational information regarding the first movable barrier operator. The encoded light beam is transmitted from an emitter associated with the first moveable barrier operator to a first detector associated with a second moveable barrier operator. The second moveable barrier operator may be subsequently operated at least in part according to the operational information encoded in the light beam.

In yet another example, the light beam is transmitted from the emitter associated with the first moveable barrier operator to a second detector associated with a third moveable barrier operator. The third moveable barrier operator is operated at least in part according to the operational information encoded in the light beam.

The operational information may include various types of information. In one example, the operational information is status information associated with the first movable barrier operator. Other types of information may also be transmitted.

The encoded light beam may be transmitted according to various approaches. In one example, the light beam is periodically transmitted. Additionally, the information transmitted may be gathered according to various approaches and from different sources. For example, at least one device may be polled to obtain polled status information and the polled status information may be transmitted using the light beam.

In other examples, a status change of an operator is detected and the status change is transmitted using the light beam to indicate the status change. The status information may be received from various sources such as from safety devices, keyboard entry devices, or from the movable barrier operators.

In still other examples, obstructions in a pathway of the first movable barrier and the second movable barrier are detected using the emitter and first detector. For example, the encoded light beam may detect obstructions when an obstruction becomes positioned in the path of the light beam and the light beam is broken.

In still others of these embodiments, a system of multiple barrier operators includes a first movable barrier operator that is configured and arranged to move a first movable barrier and a second movable barrier operator that is configured and arranged to move a second movable barrier. Power is supplied to the first movable barrier operator and the second movable barrier operator receives its power from the first movable barrier operator.

In one example, the power is transferred by electrical contacts across the barriers when the barriers are not in the open position. In this example, the first movable barrier operator and the second movable barrier operator communicate through an encoded light beam.

Thus, approaches are provided that control the operation of multiple moveable barrier operators. These approaches utilize a beam of light to communicate information from a first movable barrier operator to at least one other movable barrier operator. These approaches are easy to use, do not require trenching or use of wires between the barrier operators, and have a high resistance to electromagnetic interference.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
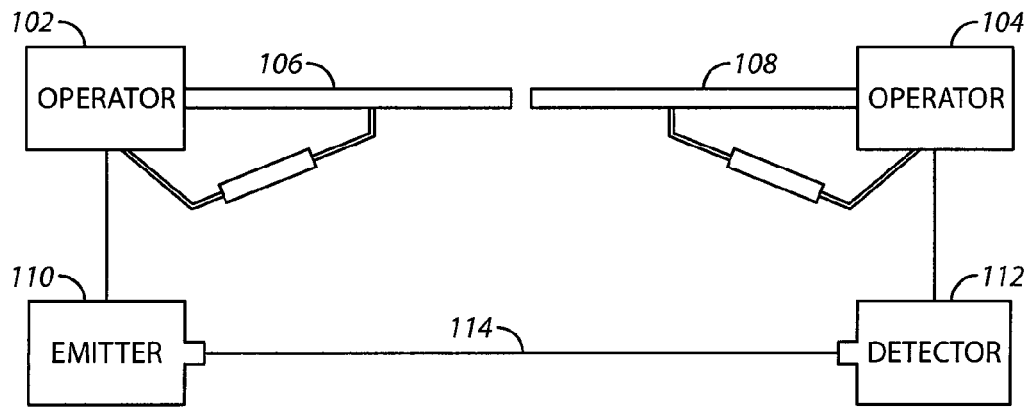
FIG. 1 comprises a block diagram of a multiple barrier operator system according to various embodiments the present invention.

Referring now to FIG. 1, one example of a multiple barrier operator system is described. The system includes a first movable barrier operator 102 that moves a first barrier 106. A second movable barrier operator 104 moves a second barrier 108. The first movable barrier operator 102 is coupled to an emitter 110. In one approach, the emitter 110 is a photo emitter that transmits a beam of light 114 to a detector 112 that is a photo detector. The detector 112 is coupled to the second movable barrier operator 104. As will be understood by those skilled in the art, this light may comprise, fully or partially, visible light. It would also be possible for non-visible light, such as infrared or ultraviolet light to be used (in whole or in part) for these purposes.

As shown in FIG. 1, the movable barrier operators are gate operators and the movable barriers are swinging gates. However, it will be appreciated that the barriers and barrier operators may be a variety of different types of barriers and barrier operators. For instance, the barrier operators may be garage door operators or swing door operators. The barriers may be swinging doors, garage doors, sliding doors, or sliding gates. Other examples of barrier operators and barriers are possible.

In one example of the operation of the system of FIG. 1, the first moveable barrier operator 102 is actuated to move the first moveable barrier 106 and a light beam 114 is encoded with operational information regarding the first movable barrier operator 102. For example, the encoding may be performed by the emitter 110. The encoded light beam 114 is transmitted from the emitter 110 to the detector 112, which is associated with the second moveable barrier operator 104. The second moveable barrier operator 104 may be subsequently operated and move the moveable barrier 108 at least in part according to the operational information encoded in the light beam 114.

The operational information encoded with the light beam 114 may include various types of information. In one example, the operational information is status information associated with the first movable barrier operator. This status information can reflect, for example, an operational status of the operator such as "moving the barrier to a closed position," "moving the barrier to an open position," "halting the movement of the barrier," "obstacle detected," "preventing movement of the barrier," and so forth. Other examples of information may also be transmitted.

The encoded light beam 114 may be transmitted according to various approaches. In one example, the light beam 114 is periodically transmitted. Additionally, the information transmitted may be gathered according to various approaches and from different sources. For example, at least one device (e.g., a safety sensor such as, but not limited to, an obstacle detector, a carbon monoxide detector, a heat detector, a movement detector, and so forth) may be polled (for example, once every second, once every 30 seconds, once every minute and so forth as desired) to obtain polled status information and the polled status information may be transmitted using the light beam 114. Additionally, the information transmitted in the encoded light beam 114 may be transmitted according to any type of format or protocol. For example, various fields including various values may be represented in the encoded light beam 114 and these fields filled with the information that is desired to be transmitted. In another example, the transmission may be queried in a bi-directional light beam system, for example, as described below with respect to FIGS. 5 and 6. The encoding itself can comprise, for example, any of a wide variety of analog and/or digital modulation techniques as are well known in the art.

In other examples, a status change of one of the operators 102 or 104 is detected and the status change is transmitted using the encoded light beam 114 to indicate the status change. The status information may be received from various sources such as from safety devices, keyboard entry devices, or from the movable barrier operators. To note a few examples, the status information may indicate a mode of operation of an operator (e.g., learn mode, normal operational mode) or other information regarding the system (e.g., the detection of an obstruction, the loss of power).

In still other examples, obstructions in a pathway of the first movable barrier and the second movable barrier are detected using the aforementioned emitter 110 and detector 112. For example, the encoded light beam 114 may detect obstructions when an obstruction is placed in the path of the encoded light beam 114 and the encoded light beam 114 is broken. Different actions may be taken upon detection of an obstruction (e.g., halting or reversing movement of one or both of the movable barriers).

Figure 2:
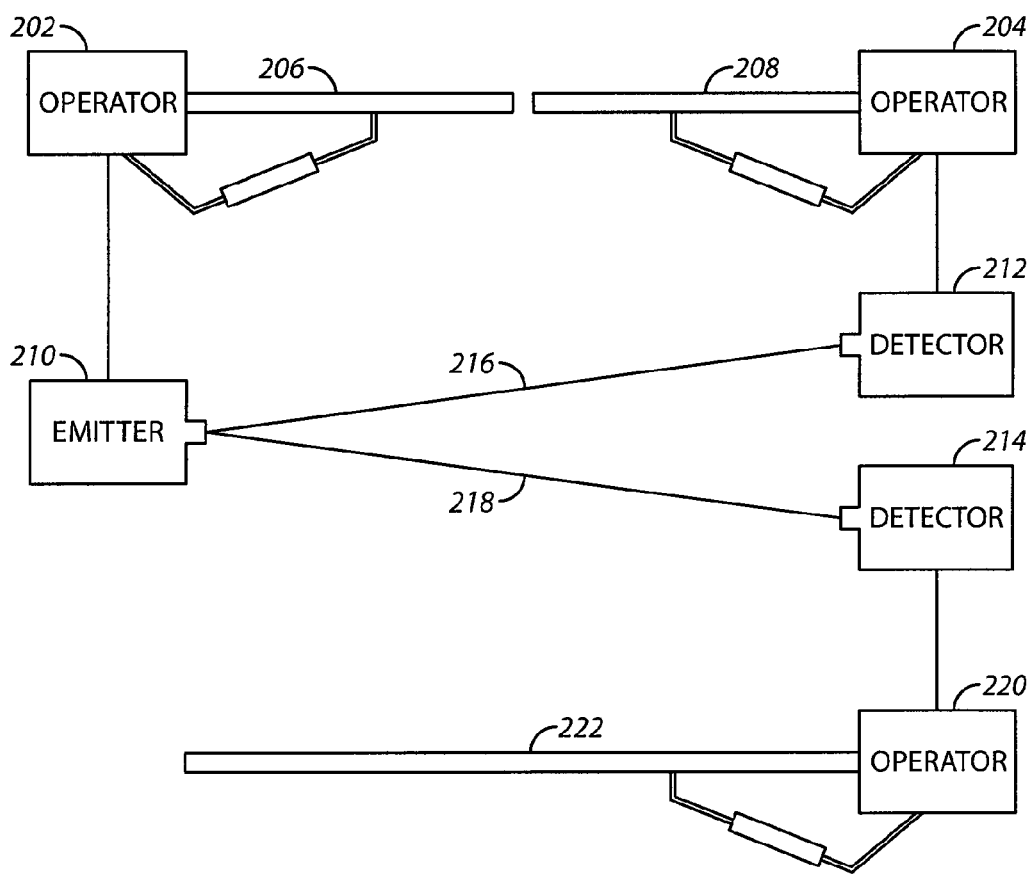
FIG. 2 comprises a block diagram of a multiple barrier operator system according to various embodiments of the present invention.

Referring now to FIG. 2, another example of a multiple barrier operator system is described. The system includes a first movable barrier operator 202 and that again moves a first barrier 206. A second movable barrier operator 204 moves a second barrier 208. The first movable barrier operator 202 is coupled to an emitter 210. In one approach, the emitter 210 is a photo emitter that transmits a beam of light 216 to a detector 212 that is a photo detector. The detector 212 is coupled to the second movable barrier operator 204. Additionally, the emitter 210 transmits a second light beam 218 to a second detector 214. Alternatively, the same light beam may be transmitted to each of the detectors. The second detector 214 is coupled to a third barrier operator 220. The third barrier operator 220 moves a third barrier 222.

As with the system shown in FIG. 1, the system of FIG. 2 includes movable barrier operators that are gate operators and the movable barriers that are gates. However, it will be appreciated that the barriers and barrier operators may be a variety of different types of barriers and barrier operators. For instance, the barrier operators may be garage door operators or swing door operators. The barriers may be swinging doors, garage doors, sliding doors, or sliding gates. Other examples of barrier operators and barriers are possible.

In one example of the operation of the system of FIG. 2, the first moveable barrier operator 202 is actuated to move the first moveable barrier 206 and a light beam 216 is encoded with operational information regarding the first movable barrier operator 202. For example, the encoding may be performed by the emitter 210. The encoded light beam 216 is transmitted from the emitter 210 associated with the first moveable barrier operator 202 to a first detector 212 associated with the second moveable barrier operator 204. The second moveable barrier operator 204 may be subsequently operated at least in part according to the operational information encoded in the light beam 216.

A second light beam 218 is transmitted from the emitter 210 associated with the first moveable barrier operator 202 to a second detector 214 associated with the third moveable barrier operator 220. The third moveable barrier operator 220 is operated at least in part according to the operational information encoded in the light beam 218 to move the third movable barrier 222. Alternatively, the same light beam 216 may be used to transmit information to the second detector 214.

The operational information transmitted in the light beams 216 and 218 may include various types of information. In one example, the operational information is status information associated with the first movable barrier operator. Other examples of information may also be transmitted. Additionally, the information transmitted in the encoded light beams 216 and 218 may be transmitted according to any type of format or protocol. For example, various fields or values may be represented in the encoded light beams 216 and 218 and these filled with the information that is desired to be transmitted.

The encoded light beams 216 and 218 may be transmitted according to various approaches. In one example, the light beams 216 and/or 218 are periodically transmitted. Additionally, the information transmitted may be gathered according to various approaches and from different sources. For example, at least one device may be polled to obtain polled status information and the polled status information may be transmitted using the light beams 216 and 218.

In other examples, a status change of an operator is detected and the status change is transmitted using the light beam upon to indicate the status change. The status information may be received from various sources such as from safety devices, keyboard entry devices, or from the operators.

In still other examples, obstructions in a pathway of the first movable barrier and the second movable barrier are detected using the emitter and first detector. For example, the encoded light beams 216 and/or 218 may detect obstructions when an obstruction is placed in the path of the light beams 216 and/or 218 and the beams 216 and/or 218 are broken.

Figure 3:
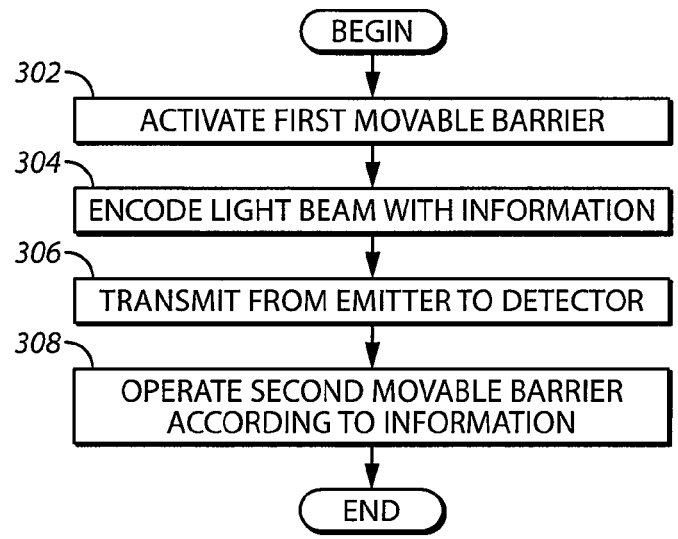
FIG. 3 comprises a flowchart of the operation of a multiple barrier operator system according to various embodiments of the present invention.

Referring now to FIG. 3, one example of an approach for controlling the operation of multiple barrier operators is described. At step 302, the first moveable barrier operator is actuated. At step 304, a light beam is encoded with information. For example, the light beam may be modulated according to various known modulation techniques with different types of information. Also, the information transmitted in the encoded light beam may be transmitted according to any type of format or protocol. For example, various fields or values may be represented in the encoded light beam and these filled with the information that is desired to be transmitted.

At step 306, the light beam with the encoded information is transmitted from an emitter associated with the first movable barrier operator to a detector associated with a second movable barrier operator. In other examples, the emitter may also transmit the light beam (or separate light beams) to other detectors associated with other movable barrier operators.

At step 308, the second movable barrier operator is operated according to the information encoded with the light beam. If other movable barriers receive the information, then the other movable barriers may also be operated in response to the information encoded in the light beam.

Figure 4:
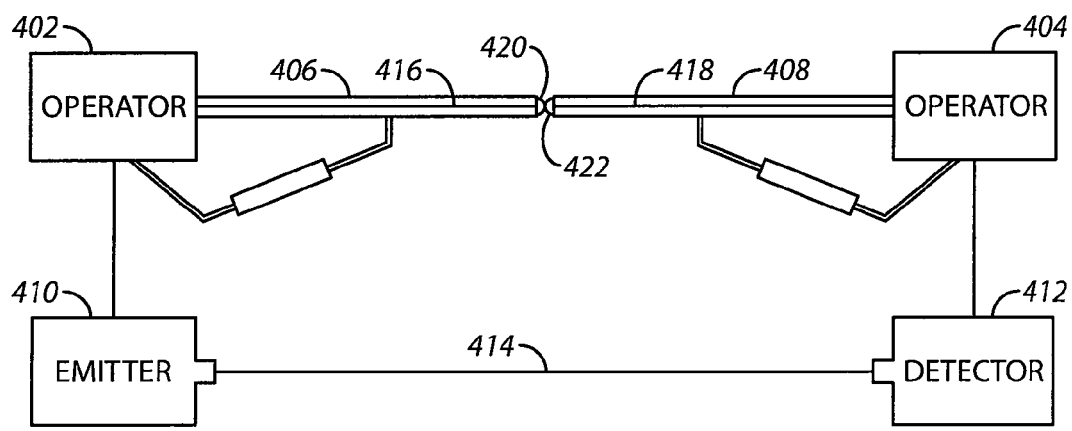
FIG. 4 comprises a block diagram of a multiple barrier operator system according to various embodiments of the present invention.

Referring now to FIG. 4, another example of a multiple barrier operator system is described. The system includes a first movable barrier operator 402. The first movable barrier operator 402 moves a first barrier 406 and a second movable barrier operator 404 moves a second barrier 408. The first movable barrier operator 402 is coupled to an emitter 410. In one approach, the emitter 410 is a photo emitter that transmits a beam of light 414 to a detector 412 that is a photo detector. The detector 412 is coupled to the second movable barrier operator 404.

A first power line 416 is positioned across the first movable barrier 406. The first power line 416 is coupled to a power source (e.g., a first battery, a so-called mains supply, a line voltage, and so forth) of the first movable barrier operator 402. A second power line 418 is positioned across the second moveable barrier 408. The second power line 418 is coupled to a second battery at the second movable barrier operator 404.

A first set of electrical contacts 420 coupled to the first movable barrier 406 engage a second set of electrical contacts 422 disposed on the second movable barrier 408 when the barriers are closed. In so doing, the first movable barrier operator 402 supplies power to the second movable barrier operator 404 when the electrical contacts 420 and 422 are engaged. As mentioned, the second movable barrier operator 404 may store the received power, for example, in a battery, for times when the contacts 420 and 422 are not engaged.

In one example of the operation of the system of FIG. 4, the first movable barrier operator 402 and the second movable barrier operator 404 communicate through the encoded light beam 414. More specifically, the first moveable barrier operator 402 is actuated to move the first moveable barrier 406 and a light beam 414 is encoded with operational information regarding the first movable barrier operator 402. The encoded light beam 414 is transmitted from the emitter 410 to the detector 412, which is associated with the second moveable barrier operator 404. The second moveable barrier operator 404 may be subsequently operated and move the moveable barrier 408 at least in part according to the operational information encoded in the light beam 414.

As mentioned, power is supplied to the first movable barrier operator 402 and the second movable barrier operator 404 receives its power (either directly or as a recharging source for a local battery or other power storage component) from the first movable barrier operator 402. In this example, the power is transferred by electrical contacts 420 and 422 across the barriers when the barriers are not in the open position. Other mechanisms can be used to transfer the power between the operators.

The information communicated from the first movable barrier operator to the second movable barrier operator may be used beneficially for a wide variety of purposes. For example, if the information communicated by the first movable barrier operator to the second movable barrier operator indicates that the first movable barrier has encountered an obstruction, then the second movable barrier operator may halt the movement of the second movable barrier. Alternatively, the second movable barrier operator upon being informed that the first movable barrier has encountered an obstruction (and the obstruction is a person) may open the second movable barrier to provide another path of ingress or egress to come to the aid of the person who was struck by the first movable barrier.

In another example, the second movable barrier may adjust the speed of movement of the second movable barrier depending upon the status of the first movable barrier operator. In still another example, a decision may be made by the second movable barrier operator as to when to open/close the second movable barrier based upon the status (e.g., open or closed) of the first movable barrier.

Figure 5:
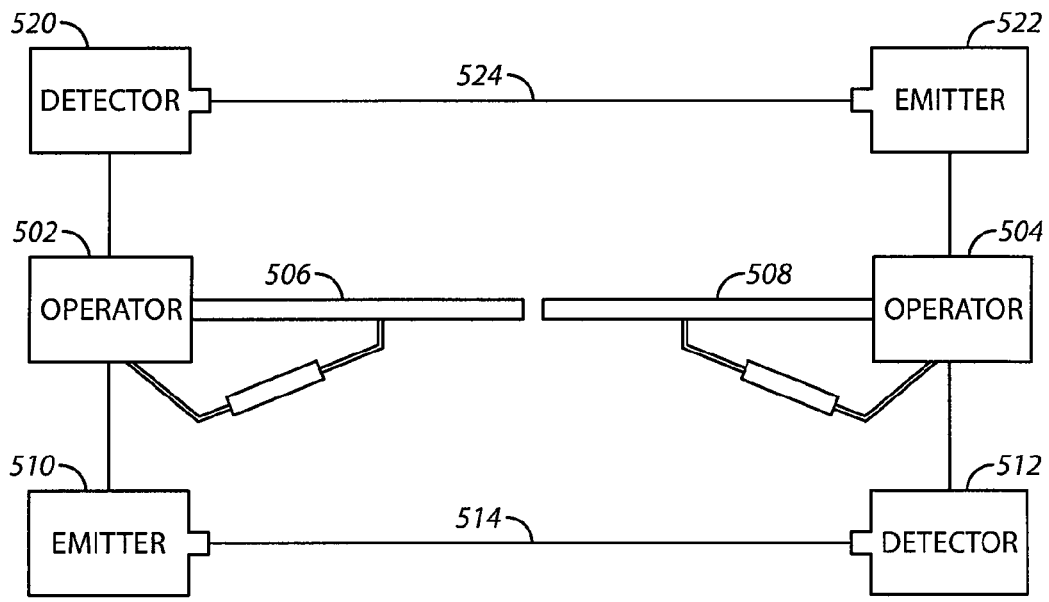
FIG. 5 comprises a block diagram of a multiple barrier operator system according to various embodiments of the present invention.

Referring now to FIG. 5, an example of a system using bi-directional communications between operators is described. As shown in FIG. 5, a first movable barrier operator 502 is connected to a first emitter 510 to transmit a first light beam 514 to a first detector 512, which is connected to a second movable barrier operator 504. The second movable barrier operator 504 is also connected to a second emitter 522. The first movable barrier operator 502 moves a first barrier 506 and the second movable barrier operator 504 moves a second movable barrier 508. The second emitter 522 transmits a second light beam 524 to a second detector 520, which is also connected to the first operator 502. The first and second light beams 514 and 524 allow the first and second operators 502 and 504 to transmit information to each other. This bi-directionality allows the operators to send questions to each other, query each other, and/or receive answers to questions or queries. In this example, the light beams 514 and 524 are also used to detect obstructions.

In the approach of FIG. 5, the emitter/detector pairs that produce the first and second light beams 514 and 524 are positioned at opposite sides of the barriers 506 and 508. Because the light beams 514 and 524 are also used to detect obstructions in the path of the barriers 506 and 508 in this example, obstructions entering the path of the barriers 506 and 508 from either side of the barriers will be detected prior to entering the pathway. In other approaches (such as that described with respect to FIG. 6), the emitter/detector pairs used to produce the light beams can be positioned on the same side of the barriers or in alternative positions.

Figure 6:
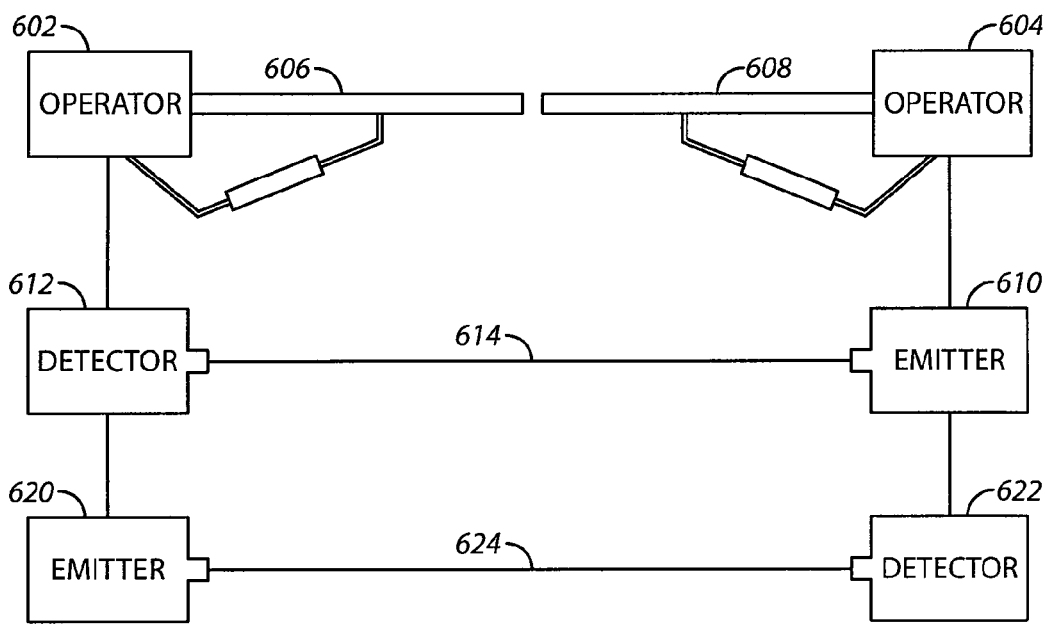
FIG. 6 comprises a block diagram of a multiple barrier operator system according to various embodiments of the present invention.

Referring now to FIG. 6, a first movable barrier operator 602 is connected to a first emitter 620 and transmits a first light beam 624 to a first detector 622. The first detector 622 is coupled to a second movable barrier operator 604. The second movable barrier operator 604 is also connected to a second emitter 610 that transmits a second light beam 614 to a second detector 612. The second detector 612 is also coupled to the first movable barrier operator 602. The first movable barrier operator 602 moves a first movable barrier 606 and the second movable barrier operator 604 moves a second movable barrier 608.

The set of the first emitter 620 and first detector 622 allows the first light beam 624 to carry information from the first movable barrier operator 602 to the second movable barrier operator 604. The set of the second emitter 610 and the second detector 612 allows the second light beam 614 to carry information from the second operator 604 to the first operator 602. Consequently, the combination of the first and second light beams 614 and 624 allow bidirectional communications to occur between the first and second movable barrier operators 602 and 604. As with the example of FIG. 5, this bi-directionality in communications allows the operators 602 and 604 to send questions to each other, query each other, and/or receive answers to questions or queries.

In this example, the emitter/detector pairs are positioned on the same side of the barriers 606 and 608. Consequently, if used for obstacle detection, the emitter/detector pairs provide detection on one side of the barriers 606 and 608. Other examples of placement for the emitter/detector pairs are possible.

Thus, approaches are provided that control the operation of multiple moveable barrier operators. These approaches utilize a beam of light to communicate information from a first movable barrier operator to at least one other movable barrier operator. These approaches are easy to use, do not require the trenching in or use of wires as between the barrier operators, and have a high resistance to interference.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

As but one example in these regards, these teachings will readily accommodate the use of multiple light carriers (and corresponding multiple encoded signals) to supplement the one light-based communication path described above. This would facilitate, for example, a possibly greater throughput of data over a given period of time and/or be useful to ensure the successful delivery of at least one of the data streams under varying operational conditions.

What is claimed is:

1. A method of operating multiple barrier operators, the method comprising:
   actuating a first moveable barrier operator to move a first moveable barrier;
   encoding a light beam with operational information regarding the first movable barrier operator;
   transmitting the encoded light beam from an emitter associated with the first moveable barrier operator to a first detector associated with a second moveable barrier operator; and
   receiving the operational information from a safety device.

2. The method of claim 1 further comprising subsequently operating the second moveable barrier operator at least in part according to the operational information encoded in the light beam.

3. The method of claim 1 wherein the operational information comprises status information associated with the first moveable barrier operator.

4. The method of claim 3 wherein transmitting the encoded light beam comprises periodically transmitting the status information using the light beam.

5. The method of claim 3 further comprising polling at least one device to obtain polled status information and wherein transmitting the encoded light beam comprises transmitting the polled status information using the light beam.

6. The method of claim 3 further comprising detecting a status change and wherein transmitting the encoded light beam comprises automatically transmitting the status change using the light beam upon detecting the status change.

7. The method of claim 1 further comprising transmitting the encoded light beam from the emitter associated with the first moveable barrier operator to a second detector associated with a third moveable barrier operator.

8. The method of claim 7 further comprising subsequently operating the third moveable barrier operator at least in part according to the operational information encoded in the light beam.

9. A method of operating multiple barrier operators, the method comprising:
actuating a first moveable barrier operator to move a first moveable barrier;
encoding a light beam with operational information regarding the first movable barrier operator;
transmitting the encoded light beam from an emitter associated with the first moveable barrier operator to a detector associated with a second moveable barrier operator;
wherein the operational information comprises status information associated with the first moveable barrier operator; and
receiving the status information from a safety device.

10. A method of operating multiple barrier operators, the method comprising:
actuating a first moveable barrier operator to move a first moveable barrier;
encoding a light beam with operational information regarding the first movable barrier operator;
transmitting the encoded light beam from an emitter associated with the first moveable barrier operator to a detector associated with a second moveable barrier operator; and
detecting obstructions in a pathway of at least one of the first movable barrier and the second movable barrier using the emitter and the detector.

11. A system of operating multiple barrier operators, the system comprising:
a first moveable barrier operator configured and arranged to move a first moveable barrier;
a second moveable barrier operator configured and arranged to move a second moveable barrier;
an emitter coupled to the first movable barrier operator;
a first detector coupled to the second movable barrier operator;
a controller coupled to the emitter and the first movable barrier operator, the controller being configured and arranged to receive operational information from the first movable barrier operator and encode a light beam with the operational information to provide an encoded light beam;
wherein the emitter is configured and arranged to transmit the encoded light beam to the first detector; and
wherein the first detector and emitter are operable to detect obstructions.

12. The system of claim 11 wherein the second movable barrier operator is configured and arranged to operate according to the operational information received in the encoded light beam received at the first detector.

13. The system of claim 11 wherein the operational information comprises status information associated with the first movable barrier operator.

14. The system of claim 13 wherein the controller is arranged and configured to periodically encode the light beam with the status information.

15. The system of claim 13 wherein the controller is configured and arranged to poll at least one device to determine the status information.

16. The system of claim 13 wherein the controller is arranged and configured to detect a status change and to automatically encode the light beam with an indication of the status change upon detecting the status change.

17. The system of claim 11 further comprising a third movable barrier operator and a second detector coupled to the third movable barrier operator, and wherein the emitter is configured and arranged to transmit the encoded light beam to the second detector.

18. The system of claim 17 wherein the third movable barrier operator is configured and arranged to operate according to the operational information received in the encoded light beam received at the second detector.

19. A moveable barrier operator comprising:
a controller configured to receive operational information regarding the movable barrier operator and further configured to generate operational commands for effecting actuation of the movable barrier operator;
the controller further configured to communicate with an emitter associated with the movable barrier operator; and
the controller further configured to, in response to receiving the operational information, to control the emitter to transmit a light beam having the operational information to a detector, wherein the emitter and the detector are operable to detect an obstruction.

20. The moveable barrier operator of claim 19 wherein the operational information comprises status information associated with the movable barrier operator.

21. The moveable barrier operator of claim 20 wherein the controller is configured to periodically encode the light beam with the status information.

22. The moveable barrier operator of claim 20 wherein the controller is configured to poll at least one device to determine the status information.

23. The moveable barrier operator of claim 20 wherein the controller is configured to detect a status change in the status information and in response to detecting the status change to automatically effect sending from the emitter a light beam with an indication of the status change.

* * * * *